United States Patent
Suzuki et al.

(10) Patent No.: US 10,618,513 B2
(45) Date of Patent: Apr. 14, 2020

(54) PARKING ASSIST METHOD AND DEVICE

(71) Applicants: Nissan Motor Co., Ltd., Yokohama-shi, Kanagawa (JP); Renault S.A.S., Boulogne-Billancourt (FR)

(72) Inventors: Yasuhiro Suzuki, Kanagawa (JP); Yasuhisa Hayakawa, Kanagawa (JP)

(73) Assignees: Nissan Motor Co., Ltd., Yokohama-shi, Kanagawa (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 16/331,809

(22) PCT Filed: Sep. 13, 2016

(86) PCT No.: PCT/JP2016/076928
§ 371 (c)(1),
(2) Date: Mar. 8, 2019

(87) PCT Pub. No.: WO2018/051396
PCT Pub. Date: Mar. 22, 2018

(65) Prior Publication Data
US 2019/0241177 A1    Aug. 8, 2019

(51) Int. Cl.
*B60W 30/06* (2006.01)
*B62D 15/02* (2006.01)

(52) U.S. Cl.
CPC ........ *B60W 30/06* (2013.01); *B62D 15/0285* (2013.01); *B60W 2720/14* (2013.01)

(58) Field of Classification Search
CPC .............. B60W 30/06; B60W 40/114; B60W 2520/14; B60W 2720/14; B62D 15/0285; G08G 1/168
See application file for complete search history.

(56) References Cited

U.S. PATENT DOCUMENTS

| | | | | |
|---|---|---|---|---|
| 8,055,429 | B2 * | 11/2011 | Kamiya | B60T 7/12 701/96 |
| 10,438,487 | B2 * | 10/2019 | Harai | B62D 6/00 |
| 10,525,974 | B2 * | 1/2020 | Nakada | B60W 30/06 |
| 2005/0236896 | A1 * | 10/2005 | Offerle | B60T 8/1755 303/146 |
| 2008/0174452 | A1 * | 7/2008 | Yamamoto | B62D 15/0275 340/932.2 |
| 2009/0132143 | A1 | 5/2009 | Kamiya et al. | |
| 2010/0271237 | A1 * | 10/2010 | Reed | G01S 13/931 340/932.2 |

(Continued)

FOREIGN PATENT DOCUMENTS

| | | |
|---|---|---|
| JP | H10264839 A | 10/1998 |
| JP | 2004351999 A | 12/2004 |
| JP | 2004352110 A | 12/2004 |

(Continued)

*Primary Examiner* — Rachid Bendidi
(74) *Attorney, Agent, or Firm* — Young Basile Hanlon & MacFarlane, P.C.

(57) ABSTRACT

In a parking assist method executed using a parking assist ECU configured to control a subject vehicle to move along a targeted parking route to a target parking position, the control amount of a yaw angle of the subject vehicle with respect to the targeted parking route is increased in accordance with the decrease in a remaining distance to the target parking position of the subject vehicle.

10 Claims, 7 Drawing Sheets

(56) References Cited

U.S. PATENT DOCUMENTS

2016/0159397 A1\* 6/2016 Baek .................... B60W 30/06
  701/41
2017/0129486 A1 5/2017 Nakada

FOREIGN PATENT DOCUMENTS

| JP | 2009208742 A | 9/2009 |
| JP | 2011000899 A | 1/2011 |
| JP | 2016011080 A | 1/2016 |
| WO | 2007013246 A1 | 2/2007 |

\* cited by examiner

PARKING ASSIST METHOD AND DEVICE

TECHNICAL FIELD

The present invention relates to a parking assist method and a parking assist apparatus.

BACKGROUND

A parking assist control apparatus is known which is configured to set a target speed so as to reduce the speed of a vehicle as the vehicle approaches a target parking position and control braking so that the vehicle travels at the target speed (see WO2007/013246, for example).

When the vehicle comes close to the target parking position, if the inclination of the vehicle with respect to the parking space is large, the driver or passenger of the vehicle may ordinarily get some uncomfortable feeling. This is also true when parking the vehicle to the target parking position by automated driving.

SUMMARY

A problem to be solved by the present invention is to provide a parking assist method and a parking assist apparatus that are able to reduce an uncomfortable feeling given to the driver or passenger of the vehicle when parking the vehicle by automated driving.

The present invention solves the above problem by increasing the control amount of a yaw angle of a vehicle with respect to a target parking route to increase the adjustment amount of an angle of the vehicle with respect to the target parking position in accordance with the decrease in a remaining distance to a target parking position of the vehicle.

According to the present invention, it is possible to alleviate an uncomfortable feeling given to the driver or passenger of the vehicle when parking the vehicle by automated driving.

DETAILED DESCRIPTION

Figure 1:
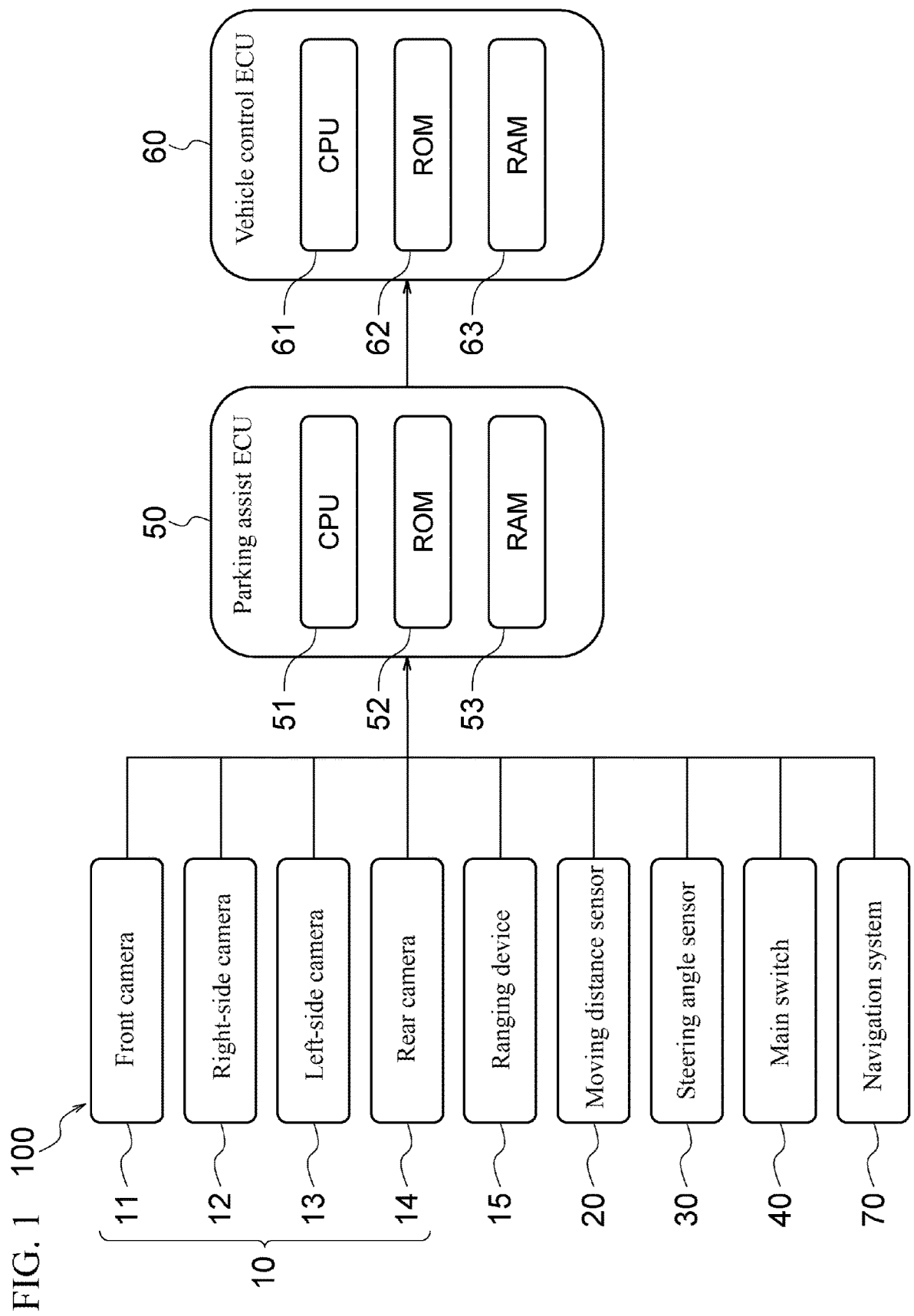
FIG. 1 is a block diagram illustrating the configuration of a parking assist apparatus according to one or more embodiments of the present invention.

Hereinafter, one or more embodiments of the present invention will be described with reference to the drawings. FIG. 1 is a block diagram illustrating the configuration of a parking assist apparatus 100 according to one or more embodiments of the present invention. The parking assist apparatus 100 is equipped in a vehicle and assists an operation of moving (parking) the vehicle into a parking space. The parking assist apparatus 100 may achieve the parking operation of the vehicle by remote control. For example, the driver or passenger of the vehicle may input a command to start the parking assist to a remote control device, such as a remote controller or a mobile terminal, outside the vehicle thereby to achieve the parking operation of the vehicle.

The parking assist apparatus 100 according to one or more embodiments of the present invention comprises a set of cameras 10, a ranging device 15, a moving distance sensor 20, a steering angle sensor 30, a main switch 40, a parking assist electronic control unit (ECU) 50, a vehicle control ECU 60, and a navigation system 70. The parking assist apparatus 100 further comprises hardware modules (not illustrated), such as an engine control ECU and a power assist ECU for steering, which are ordinarily equipped in a vehicle. These components are connected to one another via a controller area network (CAN) or other in-vehicle LAN to mutually exchange information.

The set of cameras 10 comprises a front camera 11, a right-side camera 12, a left-side camera 13, and a rear camera 14, for example, as illustrated in the figure. The front camera 11, which is installed at the front bumper of the vehicle or in the vicinity thereof, captures images ahead of the subject vehicle and outputs the image information to the parking assist ECU 50. The right-side camera 12, which is installed on the right side of the vehicle (e.g. at the right-side part of the front of the vehicle), captures images on the right side of the subject vehicle and outputs the image information to the parking assist ECU 50. The left-side camera 13, which is installed on the left side of the vehicle (e.g. at the left-side part of the front of the vehicle), captures images on the left side of the subject vehicle and outputs the image information to the parking assist ECU 50. The rear camera 14, which is installed at the rear bumper of the vehicle or in the vicinity thereof, captures images behind the subject vehicle and outputs the image information to the parking assist ECU 50.

The ranging device 15 is a radar device or a sonar, such as a millimeter-wave radar, laser radar, or ultrasonic radar. The ranging device 15 is installed at the same position as any of the cameras 11 to 14 and detects the presence or absence of objects such as obstacles, pedestrians, and other vehicles around the vehicle, the positions of the objects, and the distances to the objects.

The moving distance sensor 20 calculates the moving amount of the subject vehicle and outputs it to the parking assist ECU 50. The moving distance sensor 20 can be configured, for example, using a rotation speed sensor or the like that detects the rotation speed of a wheel of the subject vehicle.

The steering angle sensor 30, which is installed inside the steering column, for example, detects the rotation angle of the steering wheel and outputs it to the parking assist ECU 50.

The main switch 40 is a switch that is operated by the user to instruct the start of parking assist. When the main switch 40 is not operated, it outputs an OFF signal to the parking assist ECU 50, and when the main switch 40 is operated, it outputs an ON signal to the parking assist ECU 50. The main switch 40 is installed, for example, at a location on a remote control device, such as a remote controller or a mobile terminal, which is carried by the driver or passenger who performs remote control outside the vehicle, a location at which the driver can operate the main switch 40 in the vehicle, such as a location around the instrument panel of the subject vehicle or around the steering wheel, or other appropriate location. The main switch 40 may be a software switch provided on the screen of a mobile terminal such as a smartphone capable of communicating with the vehicle via a network, a software switch provided on the screen of a navigation device, or other appropriate switch.

The parking assist ECU 50 is a controller that comprehensively controls the parking assist apparatus 100. The parking assist ECU 50 comprises a ROM 52 that stores a parking assist program, a CPU 51 as an operation circuit that executes the program stored in the ROM 52 to serve as the parking assist apparatus 100 according to one or more embodiments of the present invention, and a RAM 53 that serves as an accessible storage device. The parking assist ECU 50, to which detection information is input from the set of cameras 10, the ranging device 15, the moving distance sensor 20, the steering angle sensor 30, and the main switch 40, calculates a target steering angle and a target vehicle speed of the subject vehicle and outputs them to the vehicle control ECU 60.

The vehicle control ECU 60 is a controller that performs the drive control of the vehicle. The vehicle control ECU 60 comprises a ROM 62 that stores a vehicle drive control program, a CPU 61 as an operation circuit that executes the program stored in the ROM 62 to serve as a vehicle control device, and a RAM 63 that serves as an accessible storage device. The vehicle control ECU 60, to which the target vehicle speed and target steering angle of the vehicle are input from the parking assist ECU 50, performs the drive control of the vehicle in cooperation with other ECUs, such as the engine control ECU and the power assist ECU for steering.

Figure 2:
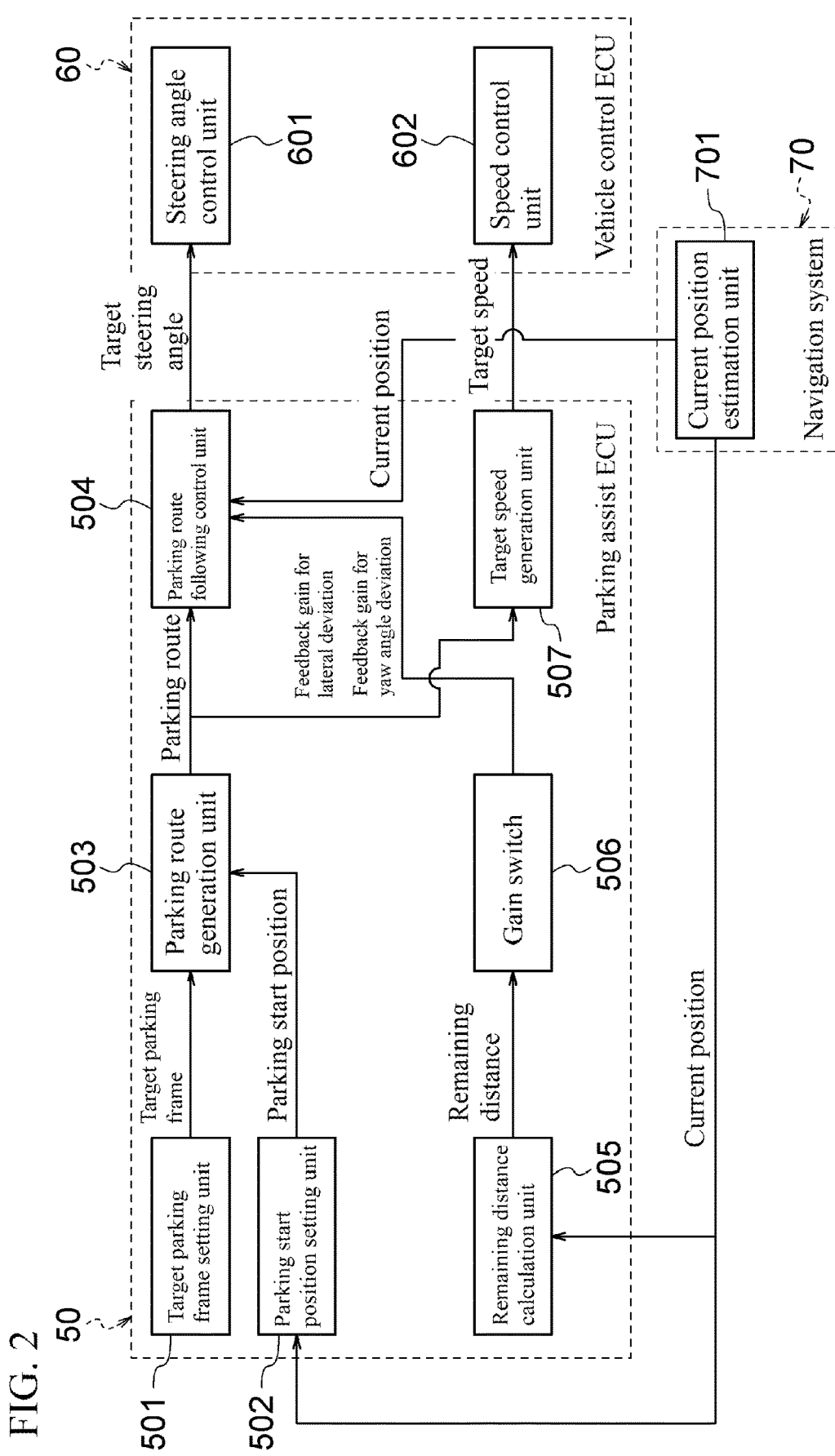
FIG. 2 is a block diagram for describing functions of a parking assist ECU of FIG. 1.

FIG. 2 is a block diagram for describing functions of the parking assist ECU 50. As illustrated in the figure, the parking assist ECU 50 comprises a target parking frame setting unit 501, a parking start position setting unit 502, a parking route generation unit 503, a parking route following control unit 504, a remaining distance calculation unit 505, a gain switch 506, and a target speed generation unit 507. The vehicle control ECU 60 includes a steering angle control unit 601 and a speed control unit 602. The navigation system 70 includes a current position estimation unit 701. The current position estimation unit 701 estimates the current position of the subject vehicle and outputs it to the parking start position setting unit 502, the parking route following control unit 504, and the remaining distance calculation unit 505. Examples of the process of estimating the current position include a process of measuring the current position of the subject vehicle utilizing a global positioning system (GPS), a process of acquiring the current position via road-to-vehicle communication, and a process of calculating the current position on the basis of the steering amount of the steering and the operation amount of the accelerator.

The target parking frame setting unit 501 sets a parking frame into which the subject vehicle is parked by automated driving (this parking frame will be referred to as a "target parking frame," hereinafter). The target parking frame setting unit 501 first detects parking frames existing in the parking lot from the images captured by the cameras 11 to 14 and then selects spaces into which parking is possible (such spaces will be referred to as "available parking spaces," hereinafter) from among the detected parking frames.

In a process of detecting parking frames, first, an overhead view image is generated from images captured by the cameras 11 to 14, and frame line candidates that may constitute parking frames are detected from the overhead view image. Then, a determination is made whether or not the detected frame line candidates satisfy determination conditions regarding the distances from other frame lines, the relative angles with respect to other frame lines, and the lengths, and spaces defined by the frame line candidates satisfying the determination conditions are detected as the parking frames. It is not essential to generate the overhead view image from the images captured by the cameras 11 to 14 and to detect the parking frames from the overhead view image. For example, information on the parking frames may be acquired via communication with the outside of the vehicle, such as so-called road-to-vehicle communication or vehicle-to-vehicle communication.

In a process of detecting available parking spaces, a determination is made whether or not obstacles such as parked vehicles are present in the detected parking frames or on the routes when parking into the parking frames, on the basis of the ranging information (reflection point information) from the ranging device 15, and parking frames without obstacles are detected as the available parking spaces. It is not essential to detect the available parking spaces on the basis of the ranging information from the ranging device 15, and the available parking spaces may also be detected from the images captured by the cameras 11 to 14 or a camera installed in the parking lot. In addition or alternatively, information on the available parking spaces may be acquired from the parking lot management center.

Then, the target parking frame setting unit 501 detects one or more parking spaces recommended for the driver or passenger of the vehicle (such parking spaces will be referred to as "recommended parking spaces," hereinafter) from among the available parking spaces and presents the recommended parking spaces to the driver or passenger of the vehicle. Examples of the process of detecting the recommended parking spaces include a process of detecting available parking spaces having the shortest required time when parking into the available parking spaces as the recommended parking spaces and a process of detecting available parking spaces closest to the gaze point of the driver of the subject vehicle as the recommended parking spaces. In a process of presenting the recommended parking spaces, the display is controlled to display an overhead view image of a plurality of parking frames including the recommended parking spaces.

Then, the target parking frame setting unit 501 receives designation of a target parking frame made by the driver or passenger of the vehicle and outputs the designated target parking frame to the parking route generation unit 503. In an exemplary method, the designation of the target parking frame may be performed in such a manner that the driver or passenger touches a recommended parking space displayed on a touch panel-type display or the driver or passenger uses an operation key to move a cursor displayed on the display to the recommended parking space displayed on the display and operates a determination button.

The parking start position setting unit 502 outputs a position at which the parking assist process is started (this position will be referred to as a "parking start position," hereinafter) to the parking route generation unit 503. For example, when the main switch 40 is operated, the parking start position setting unit 502 acquires the current position of the subject vehicle at that moment from the current position estimation unit 701 and sets the acquired current position as the parking start position.

The parking route generation unit 503 generates a route from the parking start position set by the parking start position setting unit 502 to the target parking frame set by the target parking frame setting unit 501 (this route will be referred to as a "parking route," hereinafter) and outputs the generated target parking route to the parking route following control unit 504 and the target speed generation unit 507. In a process of generating the parking route, for example, the route of a curve from the parking start position to a turning position (position at which turn for parking is performed) and the route of a curve from the turning position to the target parking frame are calculated. It is not essential to calculate the parking route, and the parking route determined for each parking frame may be preliminarily stored in a memory (ROM) and read out from the memory. In addition or alternatively, information on a preliminarily determined parking route may be acquired via road-to-vehicle communication or vehicle-to-vehicle communication.

The parking route following control unit 504 calculates a target steering angle for controlling the subject vehicle to follow the parking route output from the parking route generation unit 503 and outputs the calculated target steering angle to the steering angle control unit 601. The steering control unit 601 controls the steering angle of the subject vehicle so as to achieve the target steering angle output from the parking route following control unit 504.

Figure 3:
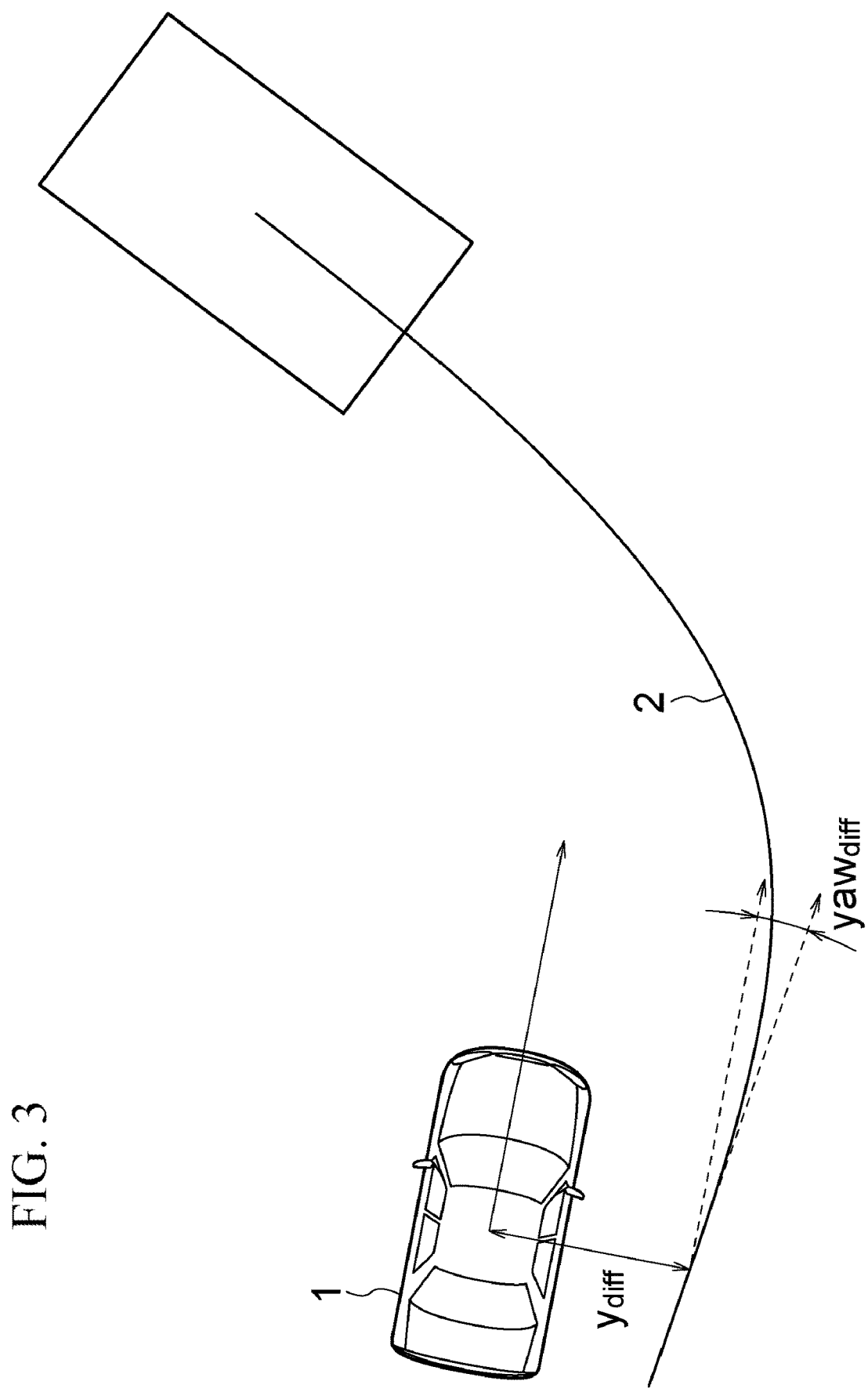
FIG. 3 is a diagram for describing the control in which the subject vehicle is controlled to follow a parking route.

FIG. 3 is a diagram for describing the control in which the subject vehicle 1 is controlled to follow a parking route 2. As illustrated in the figure, a lateral deviation $y_{diff}$ and a yaw angle deviation $yaw_{diff}$ of the subject vehicle 1 may occur with respect to the parking route 2 output from the parking route generation unit 503. The lateral deviation $y_{diff}$ is the distance between a predetermined position of the center of the subject vehicle 1 in the vehicle width direction and the parking route 2. The yaw angle deviation $yaw_{diff}$ is the angle of an axial line of the subject vehicle 1 in the longitudinal direction with respect to the tangent line of a portion of the parking route 2 having a curvature or with respect to the straight-line portion of the parking route 2.

The parking route following control unit 504 calculates a target steering angle K using the following equation (1).

[Equation 1]

$$K = K_{str\text{-}\rho} \times \rho_{traj}(l) + K_{FB\_ydiff} \times y_{diff} + K_{FB\_yawdiff} \times yaw_{diff} \quad (1)$$

The first term is a target steering angle that is set in accordance with the curvature of the parking route 2, in which $K_{str\text{-}\rho}$ is a coefficient and $\rho_{traj}(l)$ is a curvature of the parking route 2. The second term corresponds to a control amount of the lateral position between the subject vehicle 1 and the parking route 2, specifically, a target steering angle correction amount that is set in accordance with the lateral deviation $y_{diff}$, in which $K_{FB\_ydiff}$ is a feedback gain for the lateral deviation $y_{diff}$. The third term corresponds to a control amount of the yaw angle between the subject vehicle 1 and the parking route 2, specifically, a target steering angle correction amount that is set in accordance with the yaw angle deviation $yaw_{diff}$, in which $K_{FB\_yawdiff}$ is a feedback gain for the yaw angle deviation $yaw_{diff}$.

That is, the parking route following control unit 504 crosschecks the current position of the subject vehicle 1 output from the current position estimation unit 701 with the parking route 2 output from the parking route generation unit 503 to detect the lateral deviation $y_{diff}$ and yaw angle deviation $yaw_{diff}$ of the subject vehicle 1 with reference to the parking route 2 and executes feedback control in such a manner that the detected lateral deviation $y_{diff}$ and yaw angle deviation $yaw_{diff}$ decrease or become respective thresholds or less, that is, the subject vehicle 1 is controlled to follow the parking route 2.

Figure 4:
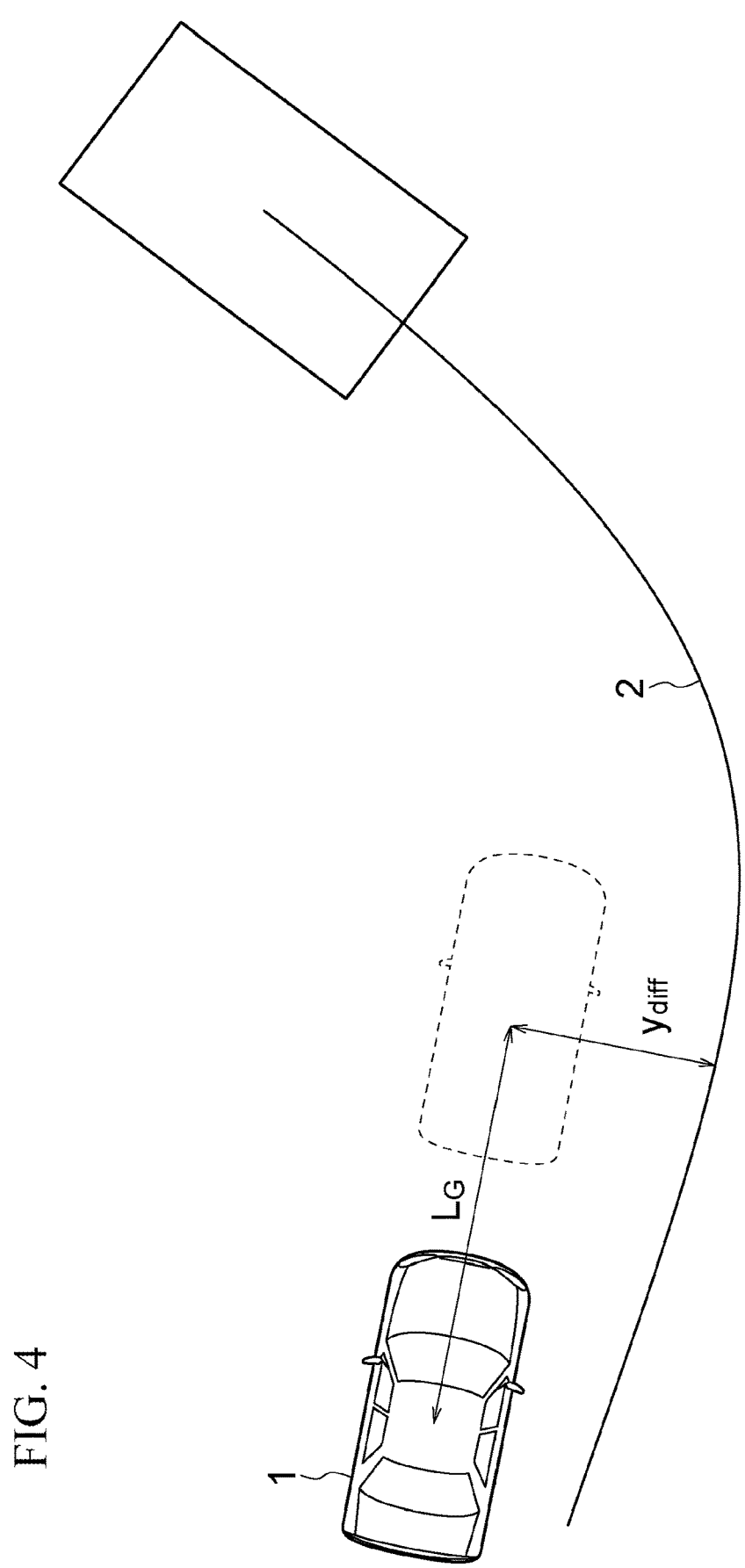
FIG. 4 is a diagram for describing a modified example of a method of calculating the second term of an equation for calculating a target steeling angle represented by the following equation (1)

FIG. 4 is a diagram for describing a modified example of a method of calculating the second term of the above equation (1). As illustrated in the figure, in this modified example, the target steering angle correction amount of the second term of the above equation (1) is calculated on the assumption that the lateral deviation $y_{diff}$ is a distance between the point of a gaze point distance $L_G$ and the parking route 2. The gaze point distance $L_G$ is a distance from the subject vehicle 1 to the gaze point located ahead of the subject vehicle 1.

The target speed generation unit 507 calculates a target speed in accordance with the parking route output from the parking route generation unit 503 and outputs the calculated target speed to the speed control unit 602. The target speed is, for example, such a speed that acceleration or deceleration is performed in accordance with the curvature of the parking route.

The remaining distance calculation unit 505 calculates a distance from the current position of the subject vehicle 1 output from the current position estimation unit 701 to the target parking frame set by the target parking frame setting unit 501 (this distance will be referred to as a "remaining distance," hereinafter) and outputs the calculated remaining distance to the gain switch 506. In a process of calculating the remaining distance, for example, the remaining distance L is calculated using the following equation (2):

[Equation 2]

$$L = L_0 - L_1 \quad (2)$$

where $L_0$ is a distance from the parking start position set by the parking start position setting unit 502 to the target parking frame set by the target parking frame setting unit 501, and $L_1$ is a moving distance from the parking start position output from the moving distance sensor 20.

The gain switch 506 switches the feedback gain $K_{FB\_ydiff}$ for the lateral deviation $y_{diff}$ and the feedback gain $K_{FB\_yawdiff}$ for the yaw angle deviation $yaw_{diff}$ of the subject vehicle 1 with respect to the parking route 2 generated by the parking route generation unit 503, in accordance with the remaining distance L output from the remaining distance calculation unit 505. Specifically, when the remaining distance L output from the remaining distance calculation unit 505 is not less than a threshold, a feedback gain $K_{FB\_ydiff1}$ for the lateral deviation $y_{diff}$ and a feedback gain $K_{FB\_yawdiff1}$ for the yaw angle deviation $yaw_{diff}$ are set. On the other hand, when the remaining distance L output from the remaining distance calculation unit 505 is less than the threshold, a feedback gain $K_{FB\_ydiff2}$ for the lateral deviation $y_{diff}$ and a feedback gain $K_{FB\_yawdiff2}$ for the yaw angle deviation $yaw_{diff}$ are set.

Here, the feedback gains $K_{FB\_yawdiff1}$ and $K_{FB\_yawdiff2}$ for the yaw angle deviation $yaw_{diff}$ satisfy the following equation (3), and the feedback gains $K_{FB\_ydiff1}$ and $K_{FB\_ydiff2}$ for the lateral deviation $y_{diff}$ satisfy the following equation (4).

[Equation 3]

$$K_{FB\_yawdiff1} < K_{FB\_yawdiff2} \quad (3)$$

[Equation 4]

$$K_{FB\_ydiff1} > K_{FB\_ydiff2} \quad (4)$$

Thus, when the remaining distance L is not less than the threshold, the gain switch 506 sets the feedback gain $K_{FB\_ydiff1}$ for the lateral deviation $y_{diff}$ and the feedback gain $K_{FB\_yawdiff1}$ for the yaw angle deviation $yaw_{diff}$ so that position correction priority control is executed to give higher priority to the correction of the lateral deviation $y_{diff}$ than the correction of the yaw angle deviation $yaw_{diff}$. On the other hand, when the remaining distance L output from the remaining distance calculation unit 505 is less than the threshold, the gain switch 506 sets the feedback gain $K_{FB\_yawdiff2}$ for the yaw angle deviation $yaw_{diff}$ and the feedback gain $K_{FB\_ydiff2}$ for the lateral deviation $y_{diff}$ so that yaw angle correction priority control is executed to give higher priority to the correction of the yaw angle deviation than the correction of the lateral deviation.

The parking route following control unit 504 therefore calculates the target steering angle K using the following equation (5) when the remaining distance L is not less than the threshold, and calculates the target steering angle K using the following equation (6) when the remaining distance L is less than the threshold.

[Equation 5]

$$K = K_{str-p} \times \rho_{traj}(l) + K_{FB\_ydiff1} \times y_{diff} + K_{FB\_yawdiff1} \times yaw_{diff} \quad (5)$$

[Equation 6]

$$K = K_{str-p} \times \rho_{traj}(l) + K_{FB\_ydiff2} \times y_{diff} + K_{FB\_yawdiff2} \times yaw_{diff} \quad (6)$$

An upper limit may be set for the third term of each of the above equations (5) and (6), that is, for the target steering angle correction amount which is set in accordance with the yaw angle deviation. In this case, the upper limit of the third term of the above equation (6) when the remaining distance L is less than the threshold may be set higher than the upper limit of the third term of the above equation (5) when the remaining distance L is not less than the threshold. In addition or alternatively, an upper limit may be set for the second term of each of the above equations (5) and (6), that is, for the target steering angle correction amount which is set in accordance with the lateral deviation. In this case, the upper limit of the second term of the above equation (5) when the remaining distance L is not less than the threshold may be set higher than the upper limit of the second term of the above equation (6) when the remaining distance L is less than the threshold. In an embodiment, when the remaining distance L is not less than the threshold, the upper limit of the second term of the above equation (5) may be set higher than the upper limit of the second term of the above equation (6) and the upper limit of the third term of the above equation (5) may be set lower than the upper limit of the third term of the above equation (6), while when the remaining distance L is less than the threshold, the upper limit of the second term of the above equation (6) may be set lower than the upper limit of the second term of the above equation (5) and the upper limit of the third term of the above equation (6) may be set higher than the upper limit of the third term of the above equation (5). In another embodiment, the feedback gains may be made constant regardless of the remaining distance L, and the upper limit of at least one of the second term and the third term in each of the above equations (5) and (6) may be varied.

The threshold of the remaining distance L is set to a shorter distance than the moving distance $L_1$ from the parking start position, such as one to several meters, for example, so that the moving distance $L_1$ until the switching of the feedback gains is executed is longer than the remaining distance L at the time when the switching of the feedback gains is executed. In an alternative embodiment, the threshold of the remaining distance L may be set to a longer distance than the moving distance $L_1$ from the parking start position.

Figure 5:
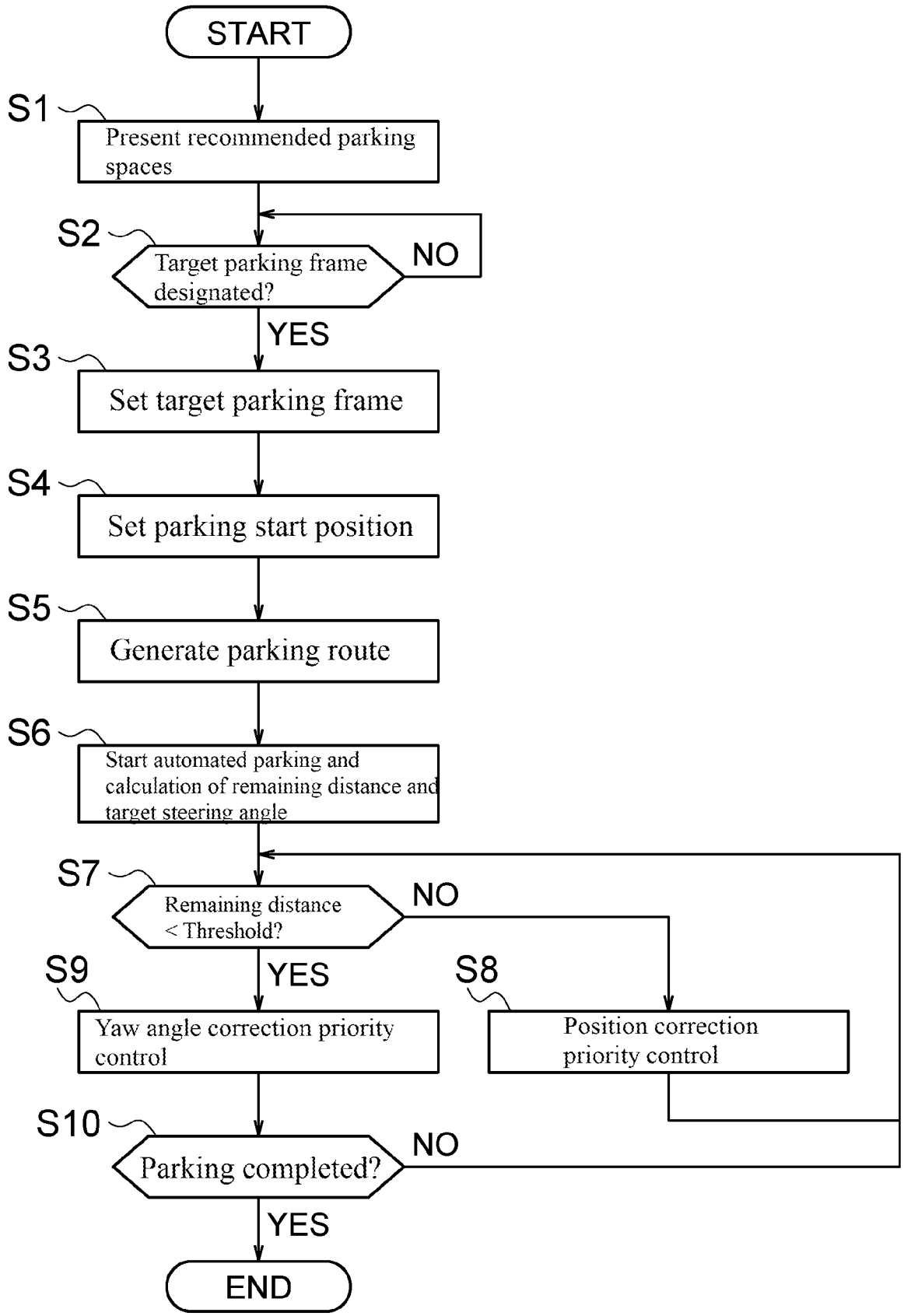
FIG. 5 is a flowchart illustrating the procedure of parking assist control executed by the parking assist apparatus of FIG. 1.

FIG. 5 is a flowchart illustrating the procedure of parking assist control executed by the parking assist apparatus 100. The parking assist control represented by the flowchart is started when the main switch 40 is operated and the start of parking assist is instructed, and the routine proceeds to step S1.

In step S1, the target parking frame setting unit 501 detects available parking spaces, detects one or more recommended parking spaces from among the available parking spaces, and controls the display to display the detected recommended parking spaces. Then, in step S2, the target parking frame setting unit 501 determines whether or not the designation of a target parking frame made by the driver or passenger of the vehicle is received. An affirmative determination is followed by step S3 in which the target parking frame setting unit 501 outputs the designated target parking frame to the parking route generation unit 503.

Then, in step S4, the parking start position setting unit 502 outputs the current position output from the current position estimation unit 701 to the parking route generation unit 503 as the parking start position. Then, in step S5, the parking route generation unit 503 generates a parking route 2 from the parking start position to the target parking frame and outputs the generated parking route 2 to the parking route following control unit 504 and the target speed generation unit 507.

Then, in step S6, automated parking is started, calculation of the remaining distance L to the target parking frame by the remaining distance calculation unit 505 is started, and calculation of the target steering angle K by the parking route following control unit 504 is started. In this step, the parking route following control unit 504 calculates the target steering angle K and outputs it to the steering angle control unit 601. The steering angle control unit 601 controls the steering angle of the subject vehicle 1 so that the target steering angle K is achieved. In addition, the target speed generation unit 507 outputs the target speed to the speed control unit 602. The speed control unit 602 controls the speed of the subject vehicle 1 so that the target speed is achieved. On the other hand, the remaining distance calculation unit 505 calculates the remaining distance L using the above equation (2) and outputs the calculated remaining distance L to the gain switch 506.

Then, in step S7, the gain switch 506 determines whether or not the remaining distance L output from the remaining distance calculation unit 505 is less than the threshold. An affirmative determination is followed by step S9 while a negative determination is followed by step S8. In step S8, the gain switch 506 sets the feedback gain for the lateral deviation $y_{diff}$ to $K_{FB\_ydiff1}$ and sets the feedback gain for the yaw angle deviation $yaw_{diff}$ to $K_{FB\_yawdiff1}$. That is, in this step, the position correction priority control is executed. The routine returns from step S8 to step S7.

On the other hand, in step S9, the gain switch 506 sets the feedback gain for the lateral deviation $y_{diff}$ to $K_{FB\_ydiff2}$ and sets the feedback gain for the yaw angle deviation $yaw_{diff}$ to $K_{FB\_yawdiff2}$. That is, in this step, the yaw angle correction priority control is executed.

Then, in step S10, the parking route following control unit 504 determines whether or not the current position of the subject vehicle output from the current position estimation unit 701 matches the target parking position in the target parking frame, that is, whether or not parking is completed. When a negative determination is made, the routine returns to step S7. When an affirmative determination is made, the process is ended.

In general, provided that the driver parks the subject vehicle by manual driving, when the distance to the target parking position is long, the driver gives higher priority to adjustment of the position of the subject vehicle with respect to the target parking position than adjustment of the angle of the subject vehicle with respect to the target parking position. Then, as the subject vehicle approaches the target parking position, the driver will be concerned about the angle of the subject vehicle with respect to the target parking position and give higher priority to adjustment of the angle of the subject vehicle with respect to the target parking position than adjustment of the position of the subject vehicle with respect to the target parking position. Thus, in a case in which an inclination of the subject vehicle to the target parking frame is large when the subject vehicle comes close to the target parking position, the driver or passenger of the subject vehicle may ordinarily get an uncomfortable feeling. Likewise, also in a case in which the subject vehicle is parked to the target parking position by automated driving, the driver or passenger of the subject vehicle will be concerned about the angle of the subject vehicle with respect to the target parking position as the subject vehicle approaches the target parking position.

In the parking assist method and the parking assist apparatus 100 according to one or more embodiments of the present invention, therefore, the control amount of the yaw angle of the vehicle with respect to the target parking route is increased in accordance with the decrease in the remaining distance to the target parking position of the vehicle. This can reduce the inclination of the subject vehicle 1 to the target parking frame when the subject vehicle 1 comes close to the target parking frame, thereby to alleviate an uncomfortable feeling given to the driver or passenger of the subject vehicle 1 when the subject vehicle 1 comes close to the target parking frame.

In the parking assist method and the parking assist apparatus 100 according to one or more embodiments of the present invention, to increase the control amount of the yaw angle of the vehicle with respect to the target parking route in accordance with the decrease in the remaining distance to the target parking position of the vehicle, the change rate of a correction amount for the yaw angle deviation $yaw_{diff}$ of the vehicle with respect to the target parking route is increased in accordance with the decrease in the remaining distance to the target parking position of the vehicle. This increases an amount of change per unit time of the yaw angle and it is therefore possible to quickly reduce the inclination of the subject vehicle 1 to the target parking frame when the subject vehicle 1 comes close to the target parking frame.

In the parking assist method and the parking assist apparatus 100 according to one or more embodiments of the present invention, to increase the control amount of the yaw angle of the vehicle with respect to the target parking route in accordance with the decrease in the remaining distance to the target parking position of the vehicle, the upper limit of a correction amount for the yaw angle deviation $yaw_{diff}$ of the vehicle with respect to the target parking route is increased in accordance with the decrease in the remaining distance to the target parking position of the vehicle. This allows the yaw angle to be widely corrected and it is therefore possible to further reduce the inclination of the subject vehicle 1 to the target parking frame when the subject vehicle 1 comes close to the target parking frame. To increase the upper limit of the correction amount, the upper limit of a target value of the yaw angle may be increased or the lower limit of the target value of the yaw angle may be reduced.

In the parking assist method and the parking assist apparatus 100 according to one or more embodiments of the present invention, the change rate of a correction amount for the yaw angle deviation $yaw_{diff}$ of the subject vehicle 1 with respect to the parking route 2 as a target is increased in accordance with the decrease in the remaining distance L to the target parking frame of the subject vehicle 1. For example, as described in the above embodiments, during a period in which the remaining distance L is not less than a threshold after the parking assist is started, correction of the yaw angle deviation $yaw_{diff}$ is carried out using a predetermined change rate, whereas after the remaining distance L becomes lower than the threshold, correction of the yaw angle deviation $yaw_{diff}$ is carried out using a higher change rate than the above predetermined change rate. This can reduce the inclination of the subject vehicle 1 to the target parking frame when the subject vehicle 1 comes close to the target parking frame, thereby to alleviate an uncomfortable feeling given to the driver or passenger of the subject vehicle 1 when the subject vehicle 1 comes close to the target parking frame. Also when the threshold of the remaining distance L is reduced to increase the change rate of the correction amount for the yaw angle deviation $yaw_{diff}$, the inclination of the subject vehicle 1 to the target parking frame can be reduced.

In the parking assist method and the parking assist apparatus 100 according to one or more embodiments of the present invention, the control amount of the yaw angle to the control amount of the lateral position of the vehicle with respect to the target parking route is increased in accordance with the decrease in the remaining distance. In other words, higher priority is given to correction of increasing the deviation of the yaw angle than correction of increasing the lateral deviation of the vehicle with respect to the target parking route in accordance with the decrease in the remaining distance. This can more effectively reduce the inclination of the subject vehicle 1 to the target parking frame when the subject vehicle 1 comes close to the target parking frame, thereby to more effectively alleviate an uncomfortable feeling given to the driver or passenger of the subject vehicle 1 when the subject vehicle 1 comes close to the target parking frame.

Here, when the correction of the lateral deviation of the subject vehicle 1 is prioritized, the correction of the yaw angle deviation of the subject vehicle 1 is delayed. In the parking assist method and the parking assist apparatus 100 according to one or more embodiments of the present invention, therefore, the priority level of the correction of the yaw angle deviation $yaw_{diff}$ is raised as compared with the correction of the lateral deviation $y_{diff}$ of the subject vehicle 1. This can more effectively reduce the inclination of the subject vehicle 1 to the target parking frame when the subject vehicle 1 comes close to the target parking frame, thereby to more effectively alleviate an uncomfortable feeling given to the driver or passenger of the subject vehicle 1 when the subject vehicle 1 comes close to the target parking frame. Moreover, during a period in which the remaining distance L is not less than a threshold after the parking assist is started, the lateral deviation $y_{diff}$ is preferentially controlled over the yaw angle deviation yaw$_{diff}$; therefore, the lateral deviation y$_{diff}$ when the remaining distance L becomes less than the threshold is smaller than that when the lateral deviation y$_{diff}$ is not preferentially controlled.

In the parking assist method and the parking assist apparatus 100 according to one or more embodiments of the present invention, the feedback gain K$_{FB\_yawdiff}$ for the yaw angle deviation yaw$_{diff}$ is relatively increased than the feedback gain K$_{FB\_ydiff}$ for the lateral deviation y$_{diff}$ in accordance with the decrease in the remaining distance L, and the priority level of the correction of the yaw angle deviation yaw$_{diff}$ can thereby be increased than the correction of the lateral deviation y$_{diff}$ of the subject vehicle 1 in accordance with the decrease in the remaining distance L.

In the parking assist method and the parking assist apparatus 100 according to one or more embodiments of the present invention, when the remaining distance L is less than a threshold, the change rate of the correction amount of the yaw angle deviation yaw$_{diff}$ is increased. Through this operation, for example, before reaching a position of several meters to the target parking frame, the correction of the lateral deviation y$_{diff}$ and the correction of the yaw angle deviation yaw$_{diff}$ can be carried out in a well-balanced manner, or the correction of the lateral deviation y$_{diff}$ can be preferentially performed over the correction of the yaw angle deviation yaw$_{diff}$, and when reaching the position of several meters to the target parking frame, the correction of the yaw angle deviation yaw$_{diff}$ can be rapidly carried out.

The threshold of the remaining distance L is set to a distance, such as one to several meters, which is shorter than the moving distance L$_1$ from the parking start position, and the moving distance L$_1$ until the switching of the feedback gain is executed is longer than the remaining distance L at the time when the switching of the feedback gain is executed. In other words, the threshold of the remaining distance L is set such that the distance from the parking start position to the position at which the change rate of the correction amount of the yaw angle deviation is increased is longer than the distance from the position at which the change rate of the correction amount of the yaw angle deviation is increased to the target parking position. Thus, during a period in which the remaining distance L is not less than the threshold after the parking assist is started, the lateral deviation y$_{diff}$ is preferentially controlled over the yaw angle deviation yaw$_{diff}$; therefore, the lateral deviation y$_{diff}$ when the remaining distance L becomes less than the threshold is smaller than that when the lateral deviation y$_{diff}$ is not preferentially controlled. The threshold of the remaining distance L can be set to a distance shorter than the moving distance L$_1$ from the parking start position thereby to suppress the lateral deviation y$_{diff}$ from deviating significantly after the remaining distance L becomes less than the threshold. Then, when the remaining distance L becomes less than the threshold, the priority level of the correction of the yaw angle deviation yaw$_{diff}$ is increased as compared with the correction of the lateral deviation y$_{diff}$ of the subject vehicle 1, and the yaw angle deviation yaw$_{diff}$ can therefore be reduced. In other words, it is possible to reduce the yaw angle deviation yaw$_{diff}$ while suppressing a large deviation of the lateral deviation y$_{diff}$.

Figure 6:
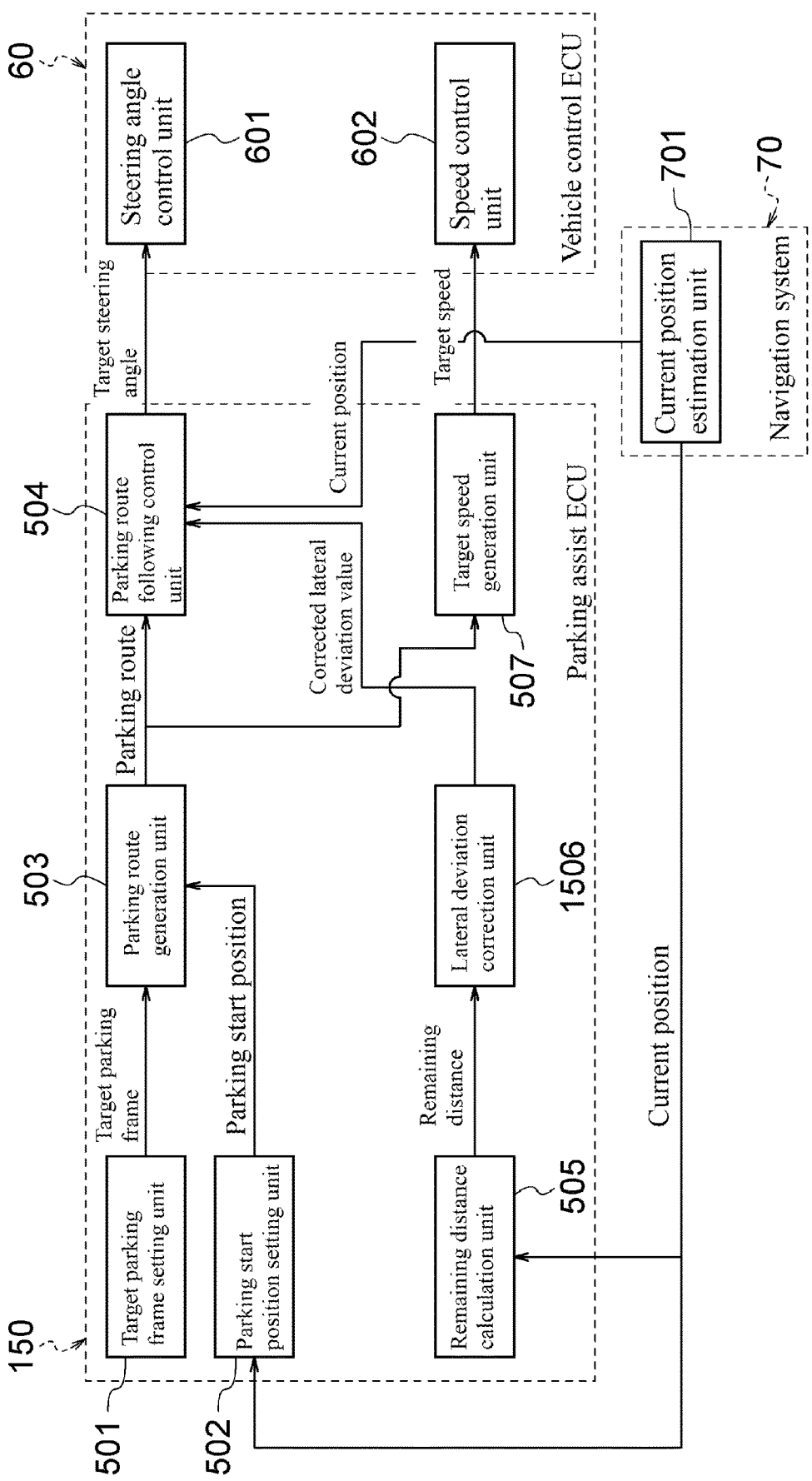
FIG. 6 is a block diagram for describing functions of a parking assist ECU according to another embodiment of the present invention.

FIG. 6 is a block diagram for describing functions of a parking assist ECU 150 according to another embodiment of the present invention. As illustrated in the figure, the parking assist ECU 150 comprises a target parking frame setting unit 501, a parking start position setting unit 502, a parking route generation unit 503, a parking route following control unit 504, a remaining distance calculation unit 505, a lateral deviation correction unit 1506, and a target speed generation unit 507. The same elements as those in the above-described embodiments are denoted with the same reference numerals, and the above description is borrowed herein with omission of duplicate descriptions.

The lateral deviation correction unit 1506 corrects the lateral deviation y$_{diff}$ of the subject vehicle 1 with respect to the parking route 2, which is generated by the parking route generation unit 503, using the following equation (7) in accordance with the remaining distance L output from the remaining distance calculation unit 505.

[Equation 7]

$$y_{diff\_hosei} = k_{hosei} \times y_{diff} \tag{7}$$

Here, y$_{diff\_hosei}$ is a corrected lateral deviation and k$_{hosei}$ is a correction coefficient. The correction coefficient is a value that decreases as the remaining distance L decreases.

That is, the lateral deviation correction unit 1506 calculates a corrected value y$_{diff\_hosei}$ of the lateral deviation that decreases as the remaining distance L decreases, and outputs the corrected value y$_{diff\_hosei}$ of the lateral deviation to the parking route following control unit 504. The parking route following control unit 504 therefore calculates a target steering angle K using the following equation (8).

[Equation 8]

$$K = K_{str\text{-}\rho} \times \rho_{traj}(l) + K_{FB\_ydiff} \times y_{diff\_hosei} + K_{FB\_yawdiff} \times yaw_{diff} \tag{8}$$

That is, as the remaining distance L decreases, the priority level of correction of the lateral deviation decreases whereas the priority level of correction of the yaw angle deviation correction increases as compared with the priority levels of the correction of the lateral deviation and the correction of the yaw angle deviation when starting the automated parking.

Figure 7:
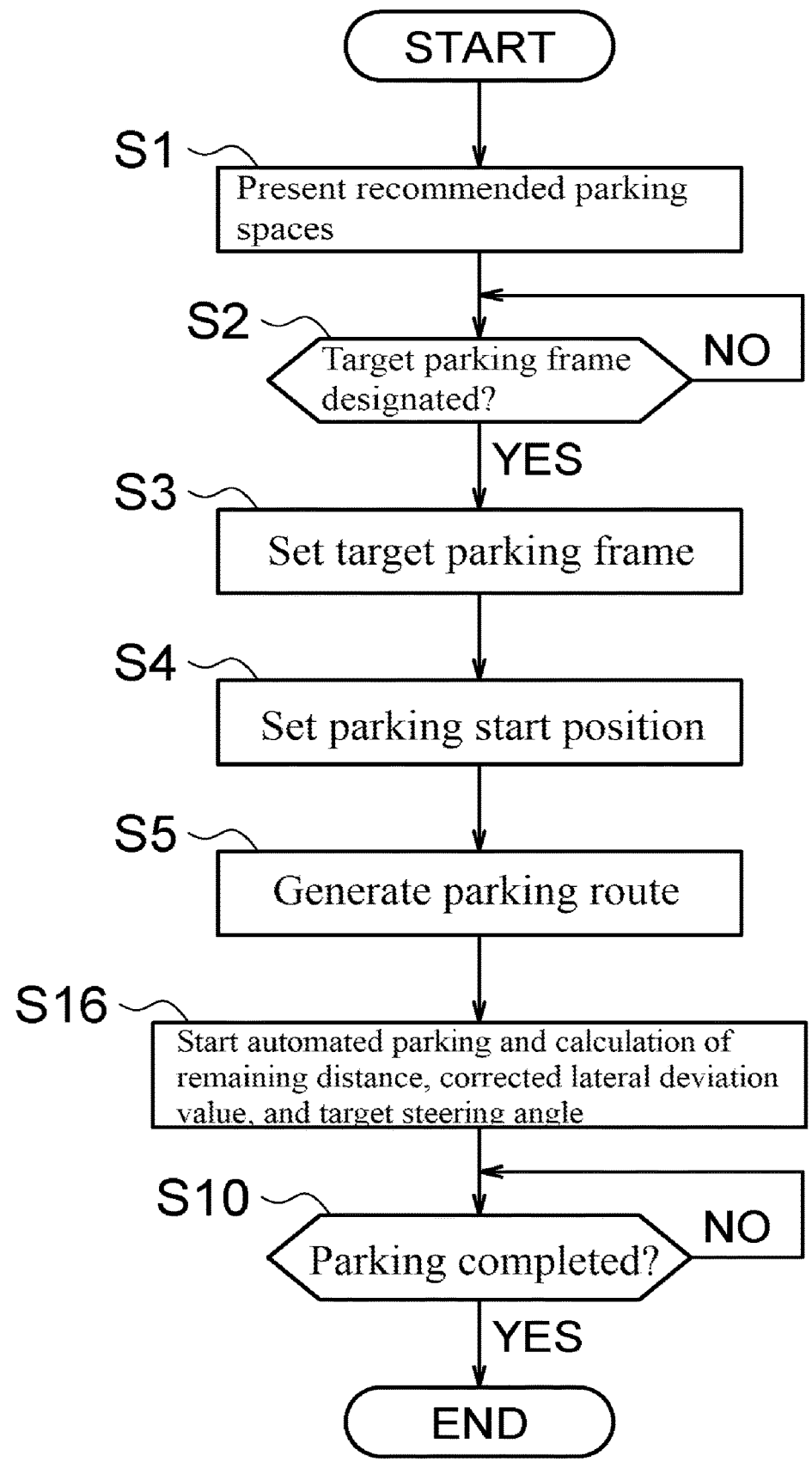
FIG. 7 is a flowchart illustrating the procedure of parking assist control executed by a parking assist apparatus according to another embodiment of the present invention.

FIG. 7 is a flowchart illustrating the procedure of parking assist control according to the present embodiment. The parking assist control represented by the flowchart is started when the main switch 40 is operated and the start of parking assist is instructed. First, steps S1 to S5 of the flowchart illustrated in FIG. 5 are executed.

Then, in step S16, automated parking is started, calculation of the remaining distance L to the target parking frame by the remaining distance calculation unit 505 is started, and calculation of the corrected lateral deviation value y$_{diff\_hosei}$ by the lateral deviation correction unit 1506 and calculation of the target steering angle K by the parking route following control unit 504 are started. In this step, the remaining distance calculation unit 505 calculates the remaining distance L using the above equation (2) and outputs it to the lateral deviation correction unit 1506. The lateral deviation correction unit 1506 calculates the corrected lateral deviation value y$_{diff\_hosei}$ using the above equation (7) in accordance with the remaining distance L output from the remaining distance calculation unit 505. The parking route following control unit 504 calculates the target steering angle K using the above equation (8).

Then, in step S10, the parking route following control unit 504 determines whether or not the current position of the subject vehicle output from the current position estimation unit 701 matches the target parking position in the target parking frame, that is, whether or not parking is completed. When a negative determination is made, the routine returns to step S16. When an affirmative determination is made, the process is ended.

As described above, in the parking assist method and the parking assist apparatus according to the present embodiment, the target steering angle K is calculated using the corrected lateral deviation value $y_{diff\_hosei}$ obtained through multiplying the detection value $y_{diff}$ of the lateral deviation by the correction coefficient $k_{hosei}$ which decreases in accordance with the decrease in the remaining distance L to the target parking position. Through this operation, the priority level of the correction of the yaw angle deviation $yaw_{diff}$ can be raised than the correction of the lateral deviation $y_{diff}$ of the subject vehicle 1 in accordance with the decrease in the remaining distance L. This can effectively reduce the inclination of the longitudinal direction of the subject vehicle 1 with respect to the longitudinal direction of the target parking frame when the subject vehicle 1 comes close to the target parking frame, and it is thereby possible to alleviate an uncomfortable feeling given to the driver or passenger of the subject vehicle 1 when the subject vehicle 1 comes close to the target parking frame.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiments, the feedback gain $K_{FB\_yawdiff}$ for the yaw angle deviation $yaw_{diff}$ and the feedback gain $K_{FB\_ydiff}$ for the lateral deviation $y_{diff}$ are switched between when the remaining distance L is not less than a threshold and when the remaining distance L is less than the threshold, but the feedback gain $K_{FB\_yawdiff}$ for the yaw angle deviation $yaw_{diff}$ may be successively increased in accordance with the decrease in the remaining distance L, or the feedback gain $K_{FB\_ydiff}$ for the lateral deviation $y_{diff}$ may be successively reduced in accordance with the decrease in the remaining distance L. In addition or alternatively, when the remaining distance L is less than a threshold, the feedback gain $K_{FB\_yawdiff}$ for the yaw angle deviation $yaw_{diff}$ may be increased while the feedback gain $K_{FB\_ydiff}$ for the lateral deviation $y_{diff}$ may not be varied.

DESCRIPTION OF REFERENCE NUMERALS

1 Subject vehicle
2 Parking route
50 Parking assist ECU
100 Parking assist apparatus

The invention claimed is:

1. A parking assist method executed using a parking assist controller configured to control a vehicle to move along a target parking route to a target parking position, the parking assist method comprising
increasing a control amount of a yaw angle of the vehicle with respect to the target parking route to increase an adjustment amount of an angle of the vehicle with respect to the target parking position in accordance with a decrease in a remaining distance to the target parking position of the vehicle.

2. The parking assist method according to claim 1, comprising
increasing a change rate of a correction amount for a deviation of the yaw angle with respect to the target parking route in accordance with the decrease in the remaining distance to the target parking position of the vehicle.

3. The parking assist method according to claim 1, comprising
increasing an upper limit of a correction amount for a deviation of the yaw angle with respect to the target parking route in accordance with the decrease in the remaining distance to the target parking position of the vehicle.

4. The parking assist method according to claim 1, comprising
giving higher priority to correction of increasing a deviation of the yaw angle than correction of increasing a lateral deviation of the vehicle with respect to the target parking route in accordance with the decrease in the remaining distance.

5. The parking assist method according to claim 1, comprising
increasing the control amount of the yaw angle than a control amount of a lateral position of the vehicle with respect to the target parking route in accordance with the decrease in the remaining distance.

6. The parking assist method according to claim 5, comprising
relatively increasing a feedback gain for a deviation of the yaw angle to a feedback gain for a lateral deviation of the vehicle with respect to the target parking route in accordance with the decrease in the remaining distance.

7. The parking assist method according to claim 5, comprising
calculating the control amount of the lateral position of the vehicle on a basis of a corrected lateral deviation value obtained through multiplying a correction amount by a detection value of a lateral deviation of the vehicle with respect to the target parking route, the correction amount decreasing in accordance with the decrease in the remaining distance.

8. The parking assist method according to claim 1, comprising
increasing the control amount of the yaw angle when the remaining distance is less than a threshold.

9. The parking assist method according to claim 8, wherein the threshold of the remaining distance is set such that a distance from a parking start position to a position at which the control amount of the yaw angle is increased is longer than a distance from the position at which the control amount of the yaw angle is increased to the target parking position.

10. A parking assist apparatus comprising a parking assist controller configured to control a vehicle to move along a target parking route to a target parking position,
the parking assist controller being further configured to increase a control amount of a yaw angle of the vehicle with respect to the target parking route to increase an adjustment amount of an angle of the vehicle with respect to the target parking position in accordance with a decrease in a remaining distance to the target parking position of the vehicle.

* * * * *